(12) United States Patent
Kim et al.

(10) Patent No.: US 11,265,072 B2
(45) Date of Patent: Mar. 1, 2022

(54) APPARATUS AND METHOD FOR BEAM ALIGNMENT BASED ON LOCATION INFORMATION IN WIRELESS COMMUNICATION SYSTEM

(71) Applicant: IUCF-HYU (Industry-University Cooperation Foundation Hanyang University), Seoul (KR)

(72) Inventors: Sunwoo Kim, Seoul (KR); Jeongwan Kang, Seoul (KR)

(73) Assignee: IUCF-HYU (Industry-University Cooperation Foundation Hanyang University), Seoul (KR)

( * ) Notice: Subject to any disclaimer, the term of this patent is extended or adjusted under 35 U.S.C. 154(b) by 57 days.

(21) Appl. No.: 16/821,304

(22) Filed: Mar. 17, 2020

(65) Prior Publication Data

US 2021/0036760 A1 Feb. 4, 2021

(30) Foreign Application Priority Data

Jul. 30, 2019 (KR) .......................... 10-2019-0092338

(51) Int. Cl.
*H04B 7/08* (2006.01)
*H04W 16/28* (2009.01)
(Continued)

(52) U.S. Cl.
CPC ........... *H04B 7/088* (2013.01); *H04L 5/0051* (2013.01); *H04W 16/28* (2013.01); *H04W 24/10* (2013.01); *H04W 76/19* (2018.02)

(58) Field of Classification Search
CPC ..... H04B 7/088; H04B 7/0695; H04L 5/0051; H04W 16/28; H04W 24/10; H04W 76/19
See application file for complete search history.

(56) References Cited

U.S. PATENT DOCUMENTS 7,013,165 B2  3/2006  Yoon et al.
9,531,446 B2  12/2016 Sadeghi et al.
(Continued)

FOREIGN PATENT DOCUMENTS

KR     100617749 B1   8/2006
KR     100668401 B1   1/2007
(Continued)

OTHER PUBLICATIONS

Millimeter Wave Beamforming for Wireless Backhaul and Access in Small Cell Networks IEEE Transactions on Communications, vol. 61, No. 10, Oct. 2013.
(Continued)

*Primary Examiner* — Kevin C. Harper
*Assistant Examiner* — Derrick V Rose

(57) ABSTRACT

A method for beam alignment through location recognition in a wireless communication system and an apparatus therefor are provided. The method includes a first process of configuring a beam set including beams based on relative location information of a terminal, a second process of receiving reference signals (RSs) from the terminal by using the beams, and a third process of determining an optimal beam from among the beams included in the beam set, and the third process includes configuring a window including adjacent beams in the beam set, measuring beams within the window by using the RSs, determining a local optimal beam from among the measured beams, and re-configuring a window based on the local optimal beam.

14 Claims, 12 Drawing Sheets

(51) Int. Cl.
*H04W 24/10* (2009.01)
*H04L 5/00* (2006.01)
*H04W 76/19* (2018.01)

(56) References Cited

U.S. PATENT DOCUMENTS

| | | | |
|---|---|---|---|
| 9,998,183 | B2 | 6/2018 | Lyu |
| 10,194,335 | B2 | 1/2019 | Choi et al. |
| 10,484,885 | B2 | 11/2019 | Kim et al. |
| 2003/0114196 | A1 | 6/2003 | Chitrapu |
| 2015/0325912 | A1 | 11/2015 | Liu |
| 2016/0099763 | A1* | 4/2016 | Chen .............. H04W 56/0045 370/329 |
| 2016/0118716 | A1 | 4/2016 | Stephenne et al. |
| 2017/0026094 | A1* | 1/2017 | Milleth .............. H04B 7/0632 |
| 2018/0041261 | A1* | 2/2018 | Modarres Razavi ...................... H04B 7/0617 |
| 2020/0220678 | A1* | 7/2020 | Liu .................. H04B 7/0695 |
| 2020/0374863 | A1* | 11/2020 | Lin .................. H04W 72/046 |

FOREIGN PATENT DOCUMENTS

| | | | |
|---|---|---|---|
| KR | 10-2013-0123087 | A | 11/2013 |
| KR | 10-2015-0035303 | A | 4/2015 |
| KR | 10-2017-0009324 | A | 1/2017 |
| KR | 10-2017-0022637 | A | 3/2017 |
| KR | 101742421 | B1 | 5/2017 |
| KR | 101881166 | B1 | 7/2018 |
| WO | 2016062190 | A1 | 4/2016 |

OTHER PUBLICATIONS

Bayesian Tree Search for Beamforming Training in Millimeter Wave Wireless Communication Systems; IEEE Wireless Communications and Networking Conference (WCNC); Jun. 2018.
Millimeter Wave Cell Search for Initial Access: Analysis, Design, and Implementation; IEEE Jul. 2017.
Initial Access in Millimeter Wave Cellular Systems IEEE Transactions on Wireless Communications, vol. 15, No. 12, Dec. 2016.
Location-Aware communication for 5G Networks; Nov. 2014.
Robust Location-Aided Beam Alignment in Millimeter Wave Massive MIMO; IEEE May 2017.
On the Initial Access Design in Millimeter Wave Cellular Networks; IEEE Jul. 2017.
Millimeter Wave Mobile Communications for 5G Cellular_It Will Work; May 10, 2013.
The Impact of Beamwidth on Temporal Channel Variation in Vehicular Channels and Its Implications IEEE Transactions on Vehicular Technology, vol. 66, No. 6, Nov. 2015.
Igbafe Orikumhi et al, "Location-aware Beam Alignment for mmWave Communications", 2018 56th Annual Allerton Conference on Communication, Control, and Computing (Allerton), Oct. 2-5, 2018 (Oct. 2, 2018).
Igbafe Orikumhi et al, "Location-aware Beam Alignment for mmWave Communications", Computer Science, Engineering, Mathematics, ArXiv, 2019(Jul. 4, 2019).
A Tutorial on Beam Management for 3GPP NR at mmWave Frequencies, Nov. 2019.
Maurizio Rea et al, "Statistical Location and Rotation-Aware Beam Search for MillimeterWave Networks," eprint arXiv:1812.08464, (Dec. 20, 2018).
Nil Gracia et al, "Location-Aided mm-Wave Channel Estimation for Vehicular Communication" 2016 IEEE 17th International Workshop on Signal Processing Advances in Wireless Communications (SPAWC).

* cited by examiner

APPARATUS AND METHOD FOR BEAM ALIGNMENT BASED ON LOCATION INFORMATION IN WIRELESS COMMUNICATION SYSTEM

CROSS-REFERENCE TO RELATED APPLICATION(S)

This application is based on and claims priority under 35 U.S.C. § 119 of a Korean patent application number 10-2019-0092338, filed on Jul. 30, 2019, in the Korean Intellectual Property Office, the disclosure of which is incorporated by reference herein in its entirety.

BACKGROUND

1. Field

The disclosure relates to a wireless communication system. More particularly, the disclosure relates to an apparatus and a method for beam alignment based on location information in a wireless communication system.

2. Description of Related Art

In a $5^{th}$ generation (5G) communication system, millimeter-wave frequency bands are used. A large-scale array antenna may be used to compensate for a high path loss caused by use of the millimeter-wave frequency bands. However, when such a large-scale array antenna is used, a beam width is reduced and thus performance of the 5G network may be degraded due to an error in beam alignment. To overcome the error in beam alignment, various beam search algorithms have been suggested.

For example, there is the exhaustive search algorithm whereby a base station (BS) and user equipment (UE) determine an optimal pair of beams by exhaustively searching a large-scale angular beam space. A method using the exhaustive search algorithm may guarantee selection of an optimal pair of beams for a fixed BS and UE, but may not be suitable for a mobile scenario due to dynamic characteristics of a millimeter-wave channel. In addition, as a size of a codebook increases due to the narrow beam width, the exhaustive search algorithm may require high calculation complexity. Accordingly, much time and high cost may be required to search all codebooks.

Another example of the beam search algorithm may be the hierarchical beam search algorithm. In the case of the hierarchical beam search algorithm, a base station or UE perform beam alignment by using a beam having a large beam width, and then selects a beam of a narrow beam width by minutely adjusting. Complexity of the hierarchical beam search algorithm may be higher than that of the exhaustive search algorithm, but overhead for alignment may be high.

The major disadvantages of the related-art beam alignment algorithms are calculation complexity, beam alignment overhead, and long time required for beam alignment, which is not suitable for a mobile environment. When long time is required to perform beam alignment, a bottleneck phenomenon may appear in a communication network during a beam alignment process. Accordingly, there is a need for a more efficient beam alignment method.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for effective beam alignment in a wireless communication system.

Additional aspects will be set forth in part in the description which follows and, in part, will be apparent from the description, or may be learned by practice of the presented embodiments.

In addition, the disclosure provides an apparatus and a method for limiting the number of beams to be searched in a wireless communication system.

In accordance with an aspect of the disclosure, a method for beam alignment of a first device, which is used in a wireless communication system is provided. The method includes configuring a beam set including a plurality of beams, based on location information of a second device, receiving reference signals (RSs) from the second device by using a plurality of adjacent beams included in a window from among the plurality of beams, and determining an optimal beam from among the beams included in the beam set.

In accordance with an aspect of the disclosure, a first device which is used in a wireless communication system is provided. The wireless communication includes a transceiver, and at least one processor connected with the transceiver, and the at least one processor is configured to configure a beam set including a plurality of beams, based on location information of a second device, receive reference signals (RSs) from the second device by using a plurality of adjacent beams included in a window from among the plurality of beams, and determine an optimal beam from among the beams included in the beam set.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
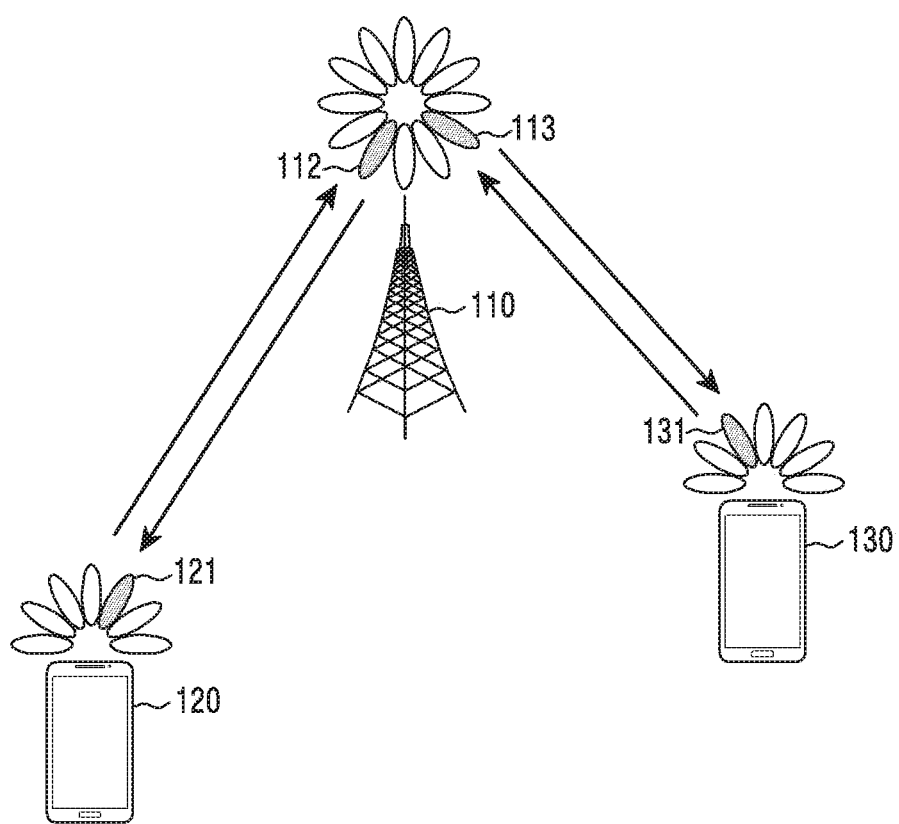
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the disclosure which will be described hereinbelow, a hardware-level approach method will be described by way of an example. However, since various embodiments of the disclosure include technology using both hardware and software, various embodiments of the disclosure do not exclude software-based approach methods.

The disclosure relates to an apparatus and a method for beam alignment through location recognition in a wireless communication system. Specifically, the disclosure describes technology for searching an optimal beam with less overhead by configuring a beam set through location information in a wireless communication system.

In the following description, a term indicating a signal, a term indicating a channel, a term indicating control information, terms indicating network entities, terms indicating components of the apparatus are exemplified for convenience of explanation. Accordingly, the disclosure is not limited to the terms which will be described below, and other terms having the same technical meanings may be used.

In addition, in the disclosure, the expression "exceed" or "less than" is used to determine whether a specific condition is satisfied or fulfilled. However, this expression is just used to express an example and does not preclude the expression "greater than or equal to" or "less than or equal to." The expression "greater than or equal to" may be substituted with "exceed," the expression "less than or equal to" may be substituted with "less than," and the expression "greater than or equal to . . . and less than . . . " may be substituted with "exceed . . . and less than or equal to . . . "

In addition, various embodiments of the disclosure will be described by using terms used in some communication standards (for example, $3^{rd}$ generation partnership project (3GPP)). However, the terms are merely examples for explanation. Various embodiments of the disclosure may be easily changed and applied to other communication systems.

FIG. 1 illustrates a wireless communication system according to an embodiment of the disclosure. Referring to FIG. 1, it illustrates a base station 110, a terminal 120, and a terminal 130 as some of nodes using a wireless channel in the wireless communication system. FIG. 1 illustrates only one base station, but may further include other base stations which are the same as or similar to the base station 110.

The base station 110 is a network infrastructure which provides wireless access to the terminals 120, 130. The base station 110 has a coverage which is defined as a predetermined geographical region based on a distance by which a signal can be transmitted. The base station 110 may be indicated by the terms "access point (AP)," "eNodeB (eNB)," "5G node," "next generation nodeB (gNB)", "wireless point," "transmission/reception point (TRP)," or other terms having the same technical meaning as the above-mentioned terms, in addition to the term "base station."

Each of the terminal 120 and the terminal 130 is a device which is used by a user, and communicates with the base station 110 through a wireless channel. In some cases, at least one of the terminal 120 and the terminal 130 may be managed without intervention of the user. That is, at least one of the terminal 120 and the terminal 130 may be a device which performs machine type communication (MTC), and may not be carried by the user. Each of the terminal 120 and the terminal 130 may be indicated by the terms "user equipment (UE)," "mobile station," "subscriber station," "remote terminal," "wireless terminal," "user device," or other terms having the same technical meaning as the above-mentioned terms, in addition to the term "terminal."

The base station 110 or the terminal 120 or 130) may be indicated by a first device or a second device. The first device and the second device may establish a wireless communication network therebetween, and may transmit and receive data, like the base station and the terminal or the terminal and the base station.

The base station 110, the terminal 120, the terminal 130 may transmit and receive wireless signals in a millimeter-wave (mmWave) band (for example, 28 GHz, 30 GHz, 38 GHz, 60 GHz). In this case, to enhance a channel gain, the base station 110, the terminal 120, the terminal 130 may perform beamforming. Herein, the beamforming may include transmission beamforming and reception beamforming. That is, the base station 110, the terminal 120, the terminal 130 may give directivity to a transmission signal and a reception signal. To achieve this, the base station 110 and the terminals 120, 130 may select serving beams 112, 113, 121, 131 through a beam search or beam management procedure. After the serving beams 112, 113, 121, 131 are selected, communication may be performed by resources having a quasi co-located (QCL) relationship with resources having transmitted the serving beams 112, 113, 121, 131.

When large-scale characteristics of a channel which has transmitted a symbol on a first antenna port can be inferred from a channel which has transmitted a symbol on a second antenna port, it may be evaluated that the first antenna port and the second antenna port have a QCL relationship. For example, the large-scale characteristics may include at least one of delay spread, doppler spread, doppler shift, average gain, average delay, spatial receiver parameter.

Figure 2:
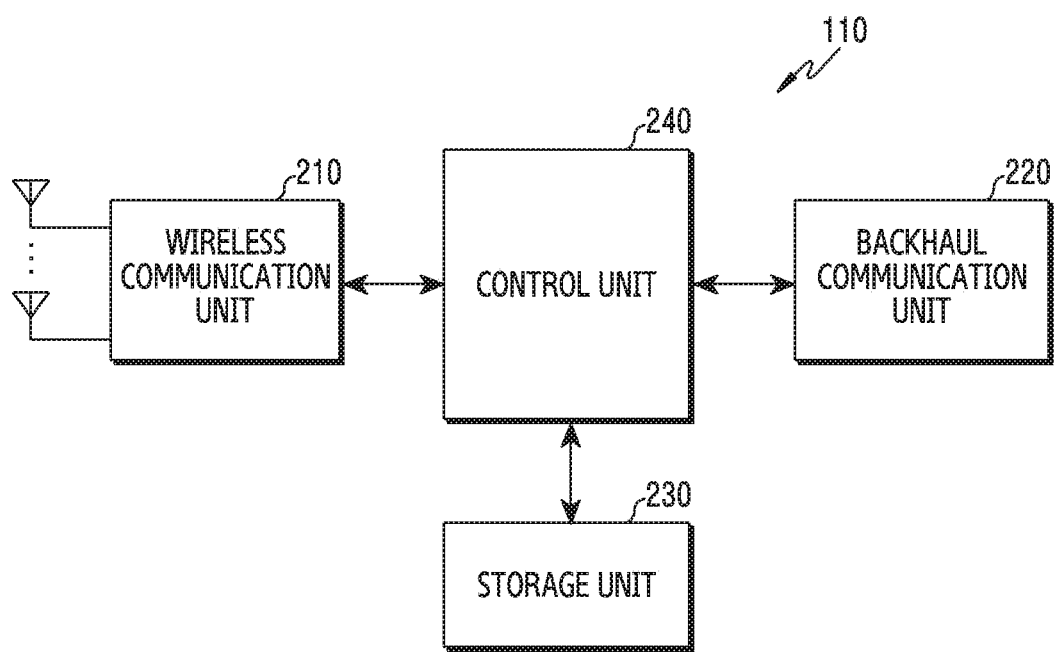
FIG. 2 illustrates a configuration of a base station in a wireless communication system according to an embodiment of the disclosure.

FIG. 2 illustrates a configuration of a base station in a wireless communication system according to an embodiment of the disclosure. The configuration illustrated in FIG. 2 may be understood as a configuration of the base station 110. The term "unit" or terms ending with suffixes "-er," and "-or" used in the following description refer to a unit processing at least one function or operation, and may be implemented by hardware, software, or a combination of hardware and software.

Referring to FIG. 2, the base station may include a wireless communication unit 210 (e.g., a mobile terminal), a backhaul communication unit 220, a storage 230 (e.g., a memory), and a controller 240 (e.g., at least one processor).

The wireless communication unit 210 performs functions for transmitting and receiving signals via a wireless channel. For example, the wireless communication unit 210 may perform a function of converting between a baseband signal and a bit stream according to a physical layer standard of the system. For example, when transmitting data, the wireless communication unit 210 may generate complex symbols by encoding and modulating a transmission bit stream. In addition, when receiving data, the wireless communication unit 210 may restore a reception bit stream by demodulating and decoding a baseband signal.

In addition, the wireless communication unit 210 may up-convert a baseband signal into a radio frequency (RF) band signal, and then may transmit the signal via an antenna, and may down-convert an RF band signal received via an antenna into a baseband signal. To achieve this, the wireless communication unit 210 may include a transmission filter, a reception filter, an amplifier, a mixer, an oscillator, a digital to analog converter (DAC), an analog to digital converter (ADC), or the like. In addition, the wireless communication unit 210 may include a plurality of transmission and reception paths. Furthermore, the wireless communication unit 210 may include at least one antenna array including a plurality of antenna elements.

In the hardware aspect, the wireless communication unit 210 may include a digital unit and an analog unit, and the analog unit may include a plurality of sub-units according to operating power, an operating frequency, or the like. The digital unit may be implemented by using at least one processor (for example, a digital signal processor (DSP)).

The wireless communication unit 210 may transmit and receive signals as described above. Accordingly, an entirety or a portion of the wireless communication unit 210 may be referred to as a "transmitter," "receiver," or "transceiver." In addition, in the following description, transmitting and receiving via a wireless channel may be used as a meaning including processing by the wireless communication unit 210 as described above.

The backhaul communication unit 220 provides an interface for communicating with the other nodes in the network. That is, the backhaul communication unit 220 may convert a bit stream to be transmitted from the base station to another node, for example, another access node, another base station, an upper node, a core network, or the like, into a physical signal, and may convert a physical signal transmitted from another node into a bit stream.

The storage 230 may store data such as a basic program for the operation of the base station, an application program, configuration information, or the like. The storage 230 may include a volatile memory, a nonvolatile memory, or a combination of a volatile memory and a nonvolatile memory. In addition, the storage 230 provides stored data according to a request of the controller 240.

The controller 240 controls overall operations of the base station. For example, the controller 240 transmits and receives a signal through the wireless communication unit 210 or the backhaul communication unit 220. In addition, the controller 240 writes and reads data on and from the storage 230. In addition, the controller 240 may perform functions of a protocol stack required by communication standards. According to another implementation example, the protocol stack may be included in the wireless communication unit 210. To achieve this, the controller 240 may include at least one processor. According to various embodiments, the controller 240 may instruct the base station to search and use data regarding location information of a terminal which is pre-stored in the storage 230. For example, the controller 240 may control the base station to perform operations according to various embodiments, which will be described below.

Figure 3:
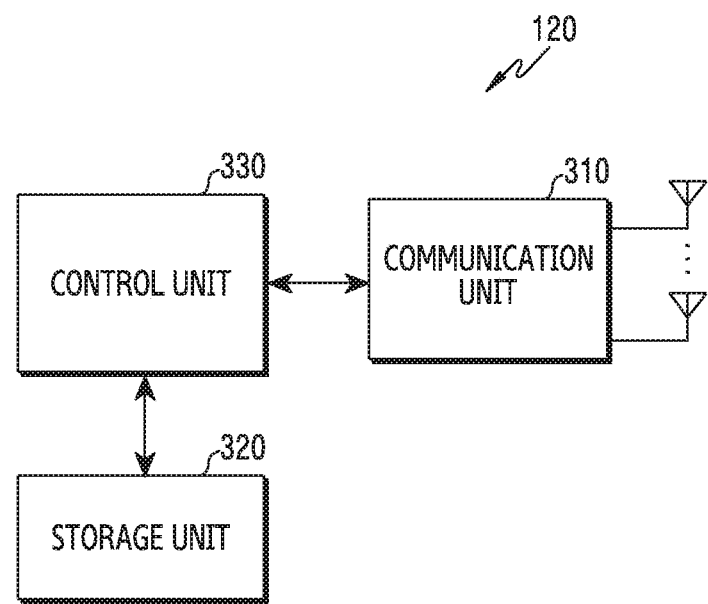
FIG. 3 illustrates a configuration of a terminal in a wireless communication system according to an embodiment of the disclosure.

FIG. 3 illustrates a configuration of a terminal in a wireless communication system according to an embodiment of the disclosure. The configuration illustrated in FIG. 3 may be understood as a configuration of the terminal 120. The term "unit" or terms ending with suffixes "-er," and "-or" used in the following description refer to a unit processing at least one function or operation, and may be implemented by hardware, software, or a combination of hardware and software.

Referring to FIG. 3, the terminal may include a communication unit 310, a storage 320, and a controller 330.

The communication unit 310 performs functions for transmitting and receiving signals via a wireless channel. For example, the communication unit 310 may perform a function of converting between a baseband signal and a bit stream according to a physical layer standard of the system. For example, when transmitting data, the communication unit 310 may generate complex symbols by encoding and modulating a transmission bit stream. In addition, when receiving data, the communication unit 310 may restore a reception bit stream by demodulating and decoding a baseband signal. In addition, the communication unit 310 may up-convert a baseband signal into an RF band signal, and then may transmit the signal via an antenna, and may down-convert an RF band signal received via an antenna into a baseband signal. For example, the communication unit 310 may include a transmission filter, a reception filter, an amplifier, a mixer, an oscillator, a DAC, an analogue-to-digital converter ADC, or the like.

In addition, the communication unit 310 may include a plurality of transmission and reception paths. Furthermore, the communication unit 310 may include at least one antenna array including a plurality of antenna elements. In the hardware aspect, the communication unit 310 may include a digital circuit and an analog circuit (for example, a radio frequency integrated circuit (RFIC)). Herein, the digital circuit and the analogue circuit may be implemented as a single package. In addition, the communication unit 310 may include a plurality of RF chains. Furthermore, the communication unit 510 may perform beamforming.

The communication unit 310 may transmit and receive signals as described above. Accordingly, an entirety or a portion of the communication unit 310 may be referred to as a "transmitter," "receiver," or "transceiver." In addition, in the following description, transmitting and receiving via a wireless channel may be used as a meaning including processing by the communication unit 310 as described above.

The storage 320 may store data such as a basic program for the operation of the terminal, an application program, configuration information, or the like. The storage 320 may include a volatile memory, a nonvolatile memory, or a combination of a volatile memory and a nonvolatile memory. In addition, the storage 320 provides stored data according to a request of the controller 330.

The controller 330 controls overall operations of the terminal. For example, the controller 330 transmits and receives signals via the communication unit 310. In addition, the controller 330 writes and reads data on and from the storage 320. In addition, the controller 330 may perform functions of a protocol stack required by communication standards. To achieve this, the controller 330 may include at least one processor or microprocessor, or may be a portion of a processor. In addition, a portion of the communication unit 310 and the controller 330 may be referred to as a communication processor (CP). According to various embodiments, the controller 330 may instruct the terminal to search and use information regarding a location of a base station which is pre-stored in the storage 320. For example, the controller 330 may control the terminal to perform operations according to various embodiments, which will be described below.

After an initial connection procedure is performed between the base station and the terminal, a connection may be established and signals may be exchanged. This state may be referred to as an initial state in the disclosure. A signal exchanged between the base station and the terminal in the initial state may include location information. The location information may be understood as a concept including an absolute location or a relative location between the base station and the terminal. For example, the location information may be global positioning system (GPS) information. In another example, the location information may include information regarding a distance between the base station and the terminal, information regarding a direction. In this case, the location information may be exchanged in real time, and the location information of each of the base station and the terminal may be stored in the storage of the terminal or the storage of the base station. The base station and the terminal may store the provided location information. In the initial state, the base station and the terminal may grasp each other's location, and may perform beamforming to transmit and receive signals. The base station and the terminal may obtain a beamforming gain by using an optimal beam.

While communication is being performed, communication may be disconnected or communication quality may be degraded due to factors such as a movement of the terminal, appearance of an obstacle, or the like. In this case, exchange of signals between the base station and the terminal may be temporarily stopped. That is, the transmission beam and the reception beam which have been used for communication may not be optimal beams any more. This state may be referred to as a beam failure state. A procedure for determining optimal beams again in the beam failure state may be referred to as a beam recovery procedure or a beam alignment procedure. To minimize degradation of communication quality that a user really feels, it is preferable to perform the beam recovery or beam alignment as soon as possible in the beam failure state.

The disclosure describes embodiments regarding efficient beam alignment for reducing the time required to reach a beam recovery state in the beam failure state. When a beam failure occurs, the base station identifies the most recent location information of the terminal, based on already-obtained location information of the terminal. In this case, the most recent location information may include information regarding a distance from the base station to the terminal, and information regarding an angle which is formed by a straight line passing the shortest distance between the terminal and the base station with reference to a virtual line passing through the base station, that is, information regarding a direction. In addition, the most recent location information may include information regarding all of factors for determining the relative location of the terminal with reference to the base station. For example, location information of the terminal which is already identified through GPS may be used. The base station may identify the most recent location information of the terminal and a time at which the corresponding location information is recorded, by using the location information of the terminal. Based on the time at which the corresponding location information is recorded, the base station may define an uncertainty region of the terminal, which will be described below. The terminal may identify information regarding a location of the base station. Since the base station has no mobility, the terminal may calculate the location of the terminal based on the most recent location information stored in the storage of the terminal. Additionally, a change in the location caused by movement of the terminal may be considered.

According to recent 3GPP standards, the base station periodically transmits synchronization signal blocks (SSBs) carrying a primary synchronization signal (PSS), a secondary synchronization signal (SSS), and a physical broadcast channel (PBCH). The location information of the base station may be shared as additional information, and the terminal may estimate its own location information by using a global navigation satellite system (GNSS) or other location estimation technology. In an embodiment of the disclosure, an error which may exist in the location information may be considered based on the fact that the location information obtained in the above-described method may not be accurate. It is assumed that a maximum location error of a location estimation method used in an embodiment of the disclosure is known to the base station and the terminal.

The base station may infer an angle of departure (AOD) and an angle of arrival (AOA) of a signal, based on previous location information of the terminal. In addition, there may exist a distribution of the estimation error regarding location information, and the distribution of the estimation error may be statistically obtained or may be included as one of localization information error margins.

To grasp accurate location information between the terminal and the base station, the distribution of the estimation error regarding the location information may be considered. For example, a GNSS may have a location error of about 3 meters in an opened space. A 5G communication network may have location accuracy of about 1 meter for a user in an opened space. A mobile device may estimate location information which may be exchanged with a base station by using high-precision location information. However, when a beam failure occurs, the base station may use previous location information of the UE having uncertainty about some locations to restrict a beam used for a beam search, instead of exhaustively searching a wide angular space to achieve beam recovery.

By using the AOD and the AOA calculated based on the previous location information, the distribution of the estimation error regarding the location information, an uncertainty region in which a current location of the terminal is estimated may be specified. The uncertainty region may be statistically obtained. In addition, each of the base station and the terminal may use a codebook which is formed of a set of beam steering vectors. In the disclosure, the codebook of the base station may be expressed by V and the codebook of the terminal may be expressed by U.

The set of beam steering vectors of the base station and the terminal may include a sub-set of beam steering vectors. The sub-sets may be expressed by Bbs, Bms, and so on. In this case, it should be understood that Bbs is included in V and Bms is included in U. Bbs and Bms may be formed of beams corresponding to the above-described uncertainty region. A sub-set of newly formed beams may be formed of fewer beam steering vectors than the total number of beam steering vectors of the codebook. Accordingly, the time required to re-search an optimal beam is reduced.

Specifically, the base station may calculate the AOA and the AOD based on previous location information of the terminal, and may define an angular space covered by the uncertainty region based on the distribution of the estimation error of the location information which is statistically obtained. In this case, beams corresponding to the angular space may be defined as a sub-set of beam steering vectors. Accordingly, beam alignment is performed only with respect to the beam steering vectors belonging to the sub-set, such that the time required to resume the wireless communication network can be reduced. An optimal beam may be determined from among the beams within the sub-set through beam alignment for the sub-set of beams, and communication may be resumed through the optimal beam.

In the process of determining the optimal beam in the sub-set of beam steering vectors, the optimal beam within the sub-set may be more efficiently determined by configuring a window which belongs to the sub-set and is formed of a set of adjacent beams.

Figure 4:
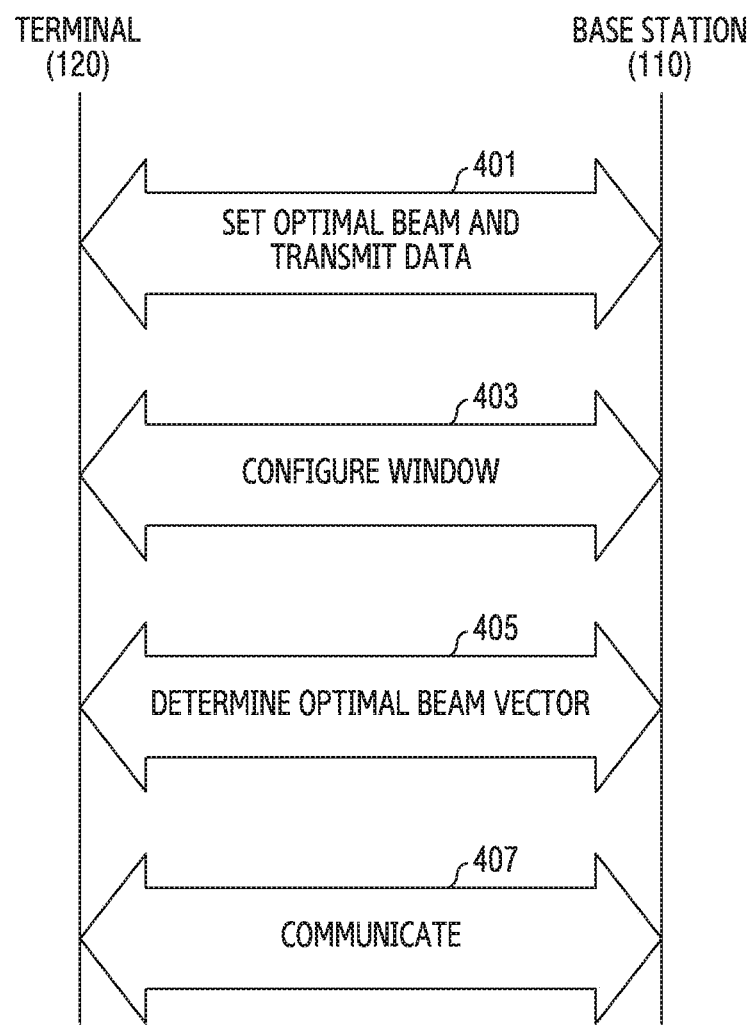
FIG. 4 schematically illustrates a beam alignment procedure in a wireless communication system according to an embodiment of the disclosure.

FIG. 4 schematically illustrates a beam alignment procedure in a wireless communication system according to an embodiment of the disclosure. FIG. 4 illustrates a beam alignment procedure between the base station 110 and the terminal 120.

Referring to FIG. 4, in operation 401, the base station 110 and the terminal 120 transmit data to each other with an optimal beam being set therebetween. Specifically, a wireless communication network may be formed between the base station and the terminal and signals may be exchanged therein. In this case, location information may be exchanged between the base station and the terminal.

In operation 403, the base station 110 configures a window. By doing so, the base station 110 may efficiently search an optimal beam. In this case, the window may include a plurality of adjacent beams from among beams belonging to a sub-set. Beam alignment may be performed through the window in phases. In this case, the beam alignment may be understood as an operation of searching an optimal beam. Specifying a region defined as a window may be referred to as configuring a window.

In operation 405, the base station 110 determines an optimal beam. Specifically, the base station 110 may measure beams by using beams within the window, and may measure beams in phases while moving a beam measurement region by re-configuring a window when necessary. By doing so, the base station 110 may determine an optimal beam in all of the sub-sets. A window may be re-configured based on a local beam within the corresponding window. Similarly, the terminal 120 may determine an optimal beam by using a window.

In operation 407, the base station 110 communicates with the terminal 120. Specifically, when the optimal beam is determined in operation 405, the base station 110 and the terminal 120 may resume communication by using the determined optimal beam.

Figure 5:
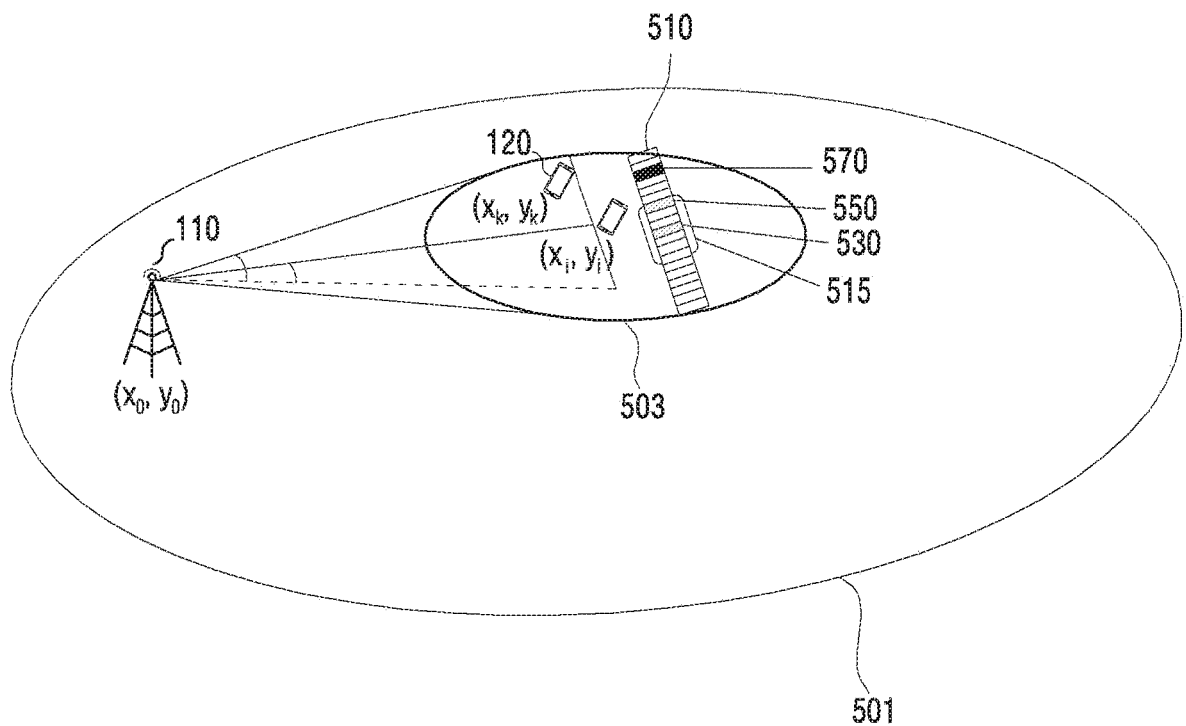
FIG. 5 illustrates a concept of a window which is used when beam alignment is performed in a wireless communication system according to an embodiment of the disclosure.

FIG. 5 illustrates a concept of a window which is used when beam alignment is performed in a wireless communication system according to an embodiment of the disclosure. FIG. 5 illustrates a scenario regarding the base station 110 and the terminal 120 which are given location coordinates (x, y). The base station 110 or the terminal 120 may limit an uncertainty region 503 by using location information and an error distribution of location information, by using a window 515 as shown in FIG. 5, instead of considering an entire angular space 501 like an exhaustive search. Beams covering the uncertainty region 503 become a new beam sub-set 510 in which beam alignment is performed. The window 515 may be used to perform a beam recovery operation rapidly, that is, to reduce the number of beams to be measured. The window 515 may be configured to include some beams within the beam sub-set 510, and a beam search range may be determined according to the beams included in the window 515. By determining the beam search range, only some of the beams of the uncertainty region 503 may be used for beam alignment. By doing so, the time required for beam alignment can be reduced.

Referring to FIG. 5, the base station 110 may specify the uncertainty region 503 in the entire angular space 510, based on previous location information $(x_i, y_i)$ of the terminal 120 and an error distribution of location information. Accordingly, the sub-set 510 of beams corresponding to the uncertainty region may be configured, and a beam that corresponds to the previous location information $(x_i, y_i)$ from among the beams included in the sub-set 510 is referred to as an initial estimated beam 530. The window 515 including a pre-defined number of adjacent beams with reference to the initial estimated beam 530 is formed. In addition, a beam that has the best performance in the window 515 is referred to as a local optimal beam 550. According to the location of the local optimal beam 550 within the window 515, the window 515 may be re-configured. When measurement within the window 515 and re-configuration of the window 515 are repeated, an actual optimal beam 570 corresponding to an actual location $(x_k, y_k)$ of the terminal 120 may be finally determined.

Figure 6:
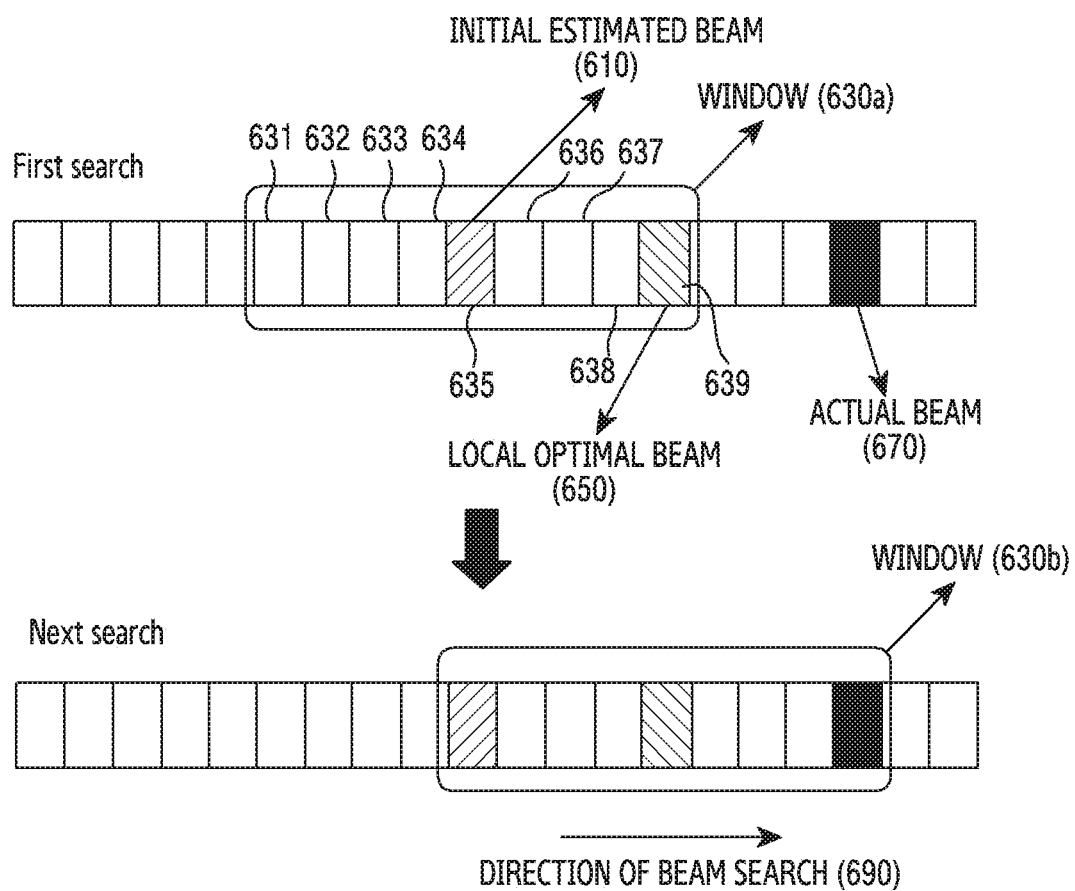
FIG. 6 illustrates a concept of a beam search using a window in a wireless communication system according to an embodiment of the disclosure.

FIG. 6 illustrates a concept of a beam search using a window in a wireless communication system according to an embodiment of the disclosure. FIG. 6 illustrates a case in which a first device (for example, a base station or a terminal) measures.

In the first search, a window 630a is configured around an initial estimated beam 610. The window 630a includes a plurality of adjacent beams 631 to 639. Herein, the nine beams are merely an example for convenience of explanation, and it should not be understood that the example limits the number of adjacent beams included in the window to nine. The window 630a may be determined with reference to the initial estimated beam 610, and the initial estimated beam 610 in FIG. 6 is the fifth beam 635 within the window.

The first device measures the beams 631-639 within the window 630a by using reference signals (RSs) received from a second device, and determines a direction 690 of beam search for the next search. The direction 690 of beam search may be determined by a local optimal beam 650. When the local optimal beam 650 does not fulfill target quality (for example, a data transmission rate), the window 630a may be re-configured to induce beam alignment in the next search, and a direction in which the window is re-configured is referred to as the direction 690 of beam search. In the case of FIG. 6, it is identified that the rightmost beam 639 within the window 630a is the local optimal beam 650. Accordingly, since it is expected that there is a better beam outside the right side of the window 630a, the window 630a moves to the right, that is, the direction 690 of beam search is determined to be the rightward direction.

Accordingly, in the next search, the re-configured window 630b includes an actual beam 670. The first device measures beams within the re-configured window 630b, thereby measuring the actual optimal beam 670. Since the actual optimal beam 670 provides quality (for example, a reception signal strength) satisfying the target quality, the beam alignment procedure may be finished.

In the embodiment described with reference to FIG. 6, when the actual optimal beam 670 satisfies the target quality, the beam alignment procedure may be finished. However, according to another embodiment, even when the actual optimal beam 670 satisfies the target quality, a beam search may further be performed. Since the actual optimal beam 670 exists on the rightmost side of the re-configured window 630b, a possibility that there is a beam providing the better quality cannot be excluded. Accordingly, after moving the window 630b further to the right, the first device may perform an additional search.

Figure 7:
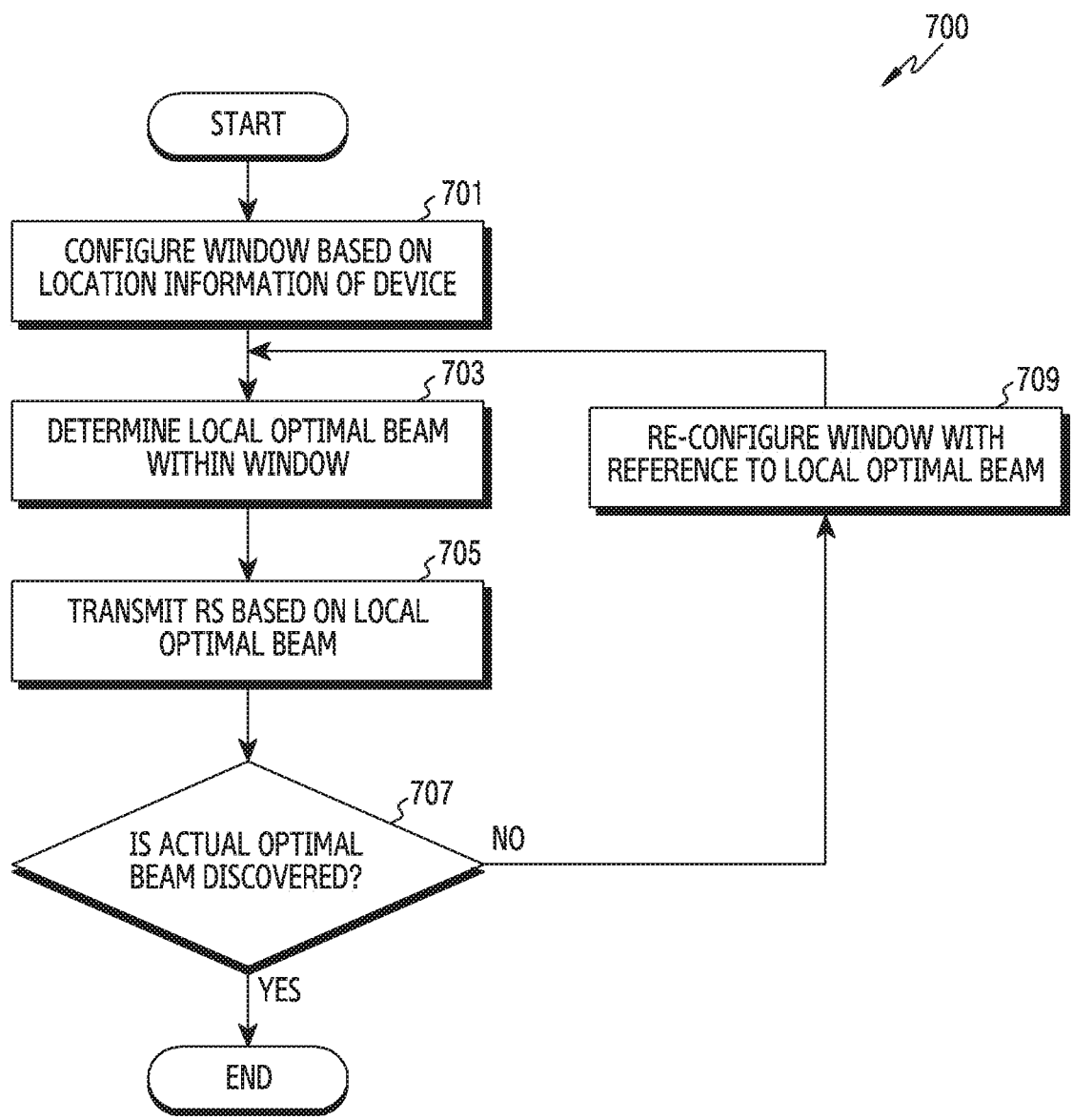
FIG. 7 is a flowchart of an apparatus for beam alignment in a wireless communication system according to an embodiment of the disclosure.

FIG. 7 is a flowchart 700 of a device for beam alignment in a wireless communication system according to an embodiment of the disclosure. FIG. 7 illustrates an operating method of the base station 110. However, the operations of FIG. 7 may be performed by the terminal 120.

Referring to FIG. 7, in operation 701, the base station configures a window based on location information of the terminal. Specifically, the base station calculates an AOD and an AOA of a signal by using previous location information of the terminal, preferably, the most recent location information, and determines an error distribution of location information based on pre-stored information or statistically calculated information. Based on the calculated AOD and AOA and the determined error distribution of the location information, the base station defines an uncertainty region in which a current location of the terminal is estimated. In addition, the base station defines a sub-set of beams which is formed of beams corresponding to the uncertainty region. To enhance efficiency of a search in searching an optimal beam from among the beams belonging to the sub-set, a sub base station configures a window which is formed of a plurality of adjacent beams in the sub-set.

In operation 703, the base station determines a local optimal beam within the window. The local optimal beam refers to a beam that provides the highest channel quality within the window. The base station receives and measures RSs (for example, sounding RSs) received from the terminal by using the beams within the window, and then determines the local optimal beam by comparing results of measuring.

In operation 705, the base station transmits RSs through the local optimal beam. That is, the base station may transmit the RSs in order for the terminal to determine a local optimal beam. Herein, the number of RSs transmitted may be greater than or equal to the number of beams included in a window configured at the terminal.

In operation 707, the base station identifies whether an actual optimal beam is discovered. Specifically, when the base station determines the optimal beam from among the plurality of beams belonging to the window, that is, the local optimal beam, the base station identifies whether the local optimal beam is an actual optimal beam. For example, it is determined whether the local optimal beam is the actual optimal beam, based on at least one of a location of the local optimal beam within the window, and a measurement value of the local optimal beam. For example, when the location of the local optimal beam is an end of the window, it may be determined that the local optimal beam is not the actual optimal beam. In another example, when the measurement value of the local optimal beam is less than a threshold, it may be determined that the local optimal beam is not the actual optimal beam.

When the local optimal beam is not the actual optimal beam, the base station re-configures the window with reference to the local optimal beam (operation 709). Thereafter, the base station repeats operations 703, 705, 707. That is, the base station may measure beams belonging to the re-configured window, may select a local optimal beam within the re-configured window, and then may determine whether the local optimal beam is the actual optimal beam.

In the embodiment described with reference to FIG. 7, it may be determined whether the local optimal beam is the actual optimal beam, based on at least one of the location of the local optimal beam within the window, the measurement value of the local optimal beam. Herein, when the measurement value is used, the measurement value is compared with a threshold. In this case, according to an embodiment, the threshold to be compared with the measurement value may vary according to the location of the local optimal beam within the window. For example, a threshold when the local optimal beam is located at an end of the window may be defined as being greater than a threshold when the local optimal beam is located at a place other than the end of the window.

Figure 8:
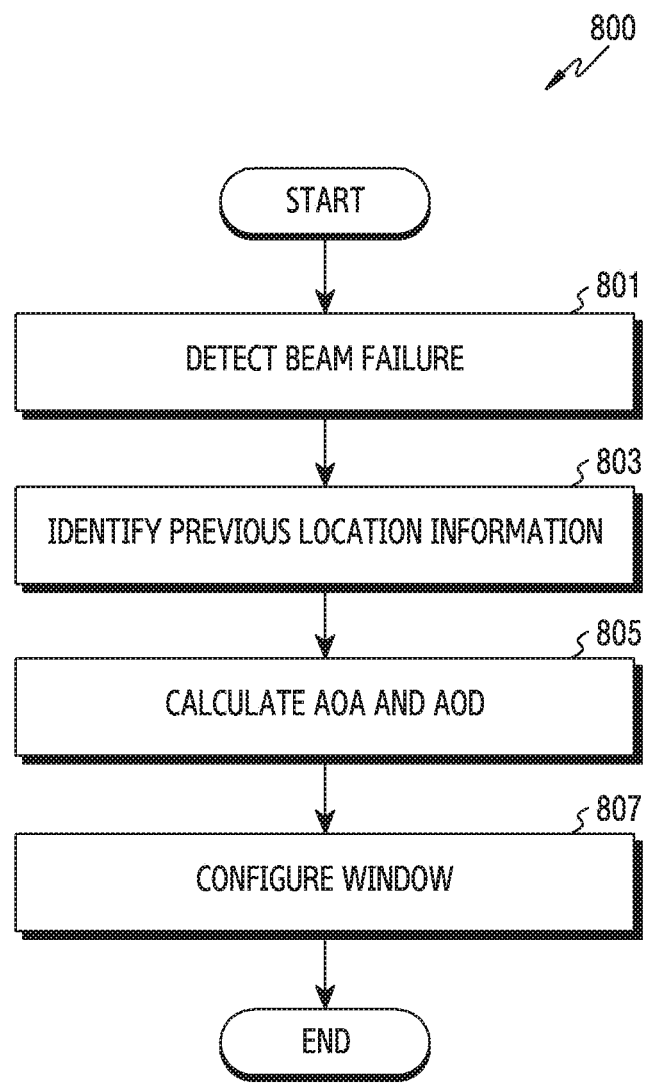
FIG. 8 is a flowchart for configuring a window in a wireless communication system according to an embodiment of the disclosure.

FIG. 8 is a flowchart 800 for configuring a window in a wireless communication system according to an embodiment of the disclosure. FIG. 8 illustrates an operating method of the base station 110. However, the operations of FIG. 8 may be performed by the terminal 120.

Referring to FIG. 8, in operation 801, the base station detects occurrence of a beam failure. Due to the beam failure, wireless communication between the base station and the terminal may be temporarily stopped or restricted.

In operation 803, the base station identifies previous location information of the terminal. Previous location information may be stored in the storage included in each of the base station and the terminal in real time, and the base station may give a search command related to previous location information to the storage of the base station. Accordingly, the base station may identify the most recent location information stored in the storage or the most recent location information and information regarding a time at which the corresponding location information is stored.

In operation 805, the base station calculates an AOA and an AOD. The AOA and the AOD may be calculated based on location information of the terminal. Specifically, the base station may calculate the AOD and the AOA of a signal transmitted from the base station, based on the identified previous location information.

In operation 807, the base station configures a window. The base station may determine a region in which the terminal is expected to be located, based on information regarding the AOD and the AOA, information regarding a distribution of an estimation error of already known location information. The distribution of the estimation error of the location information may be statistically obtained or may be a pre-defined value.

Figure 9:
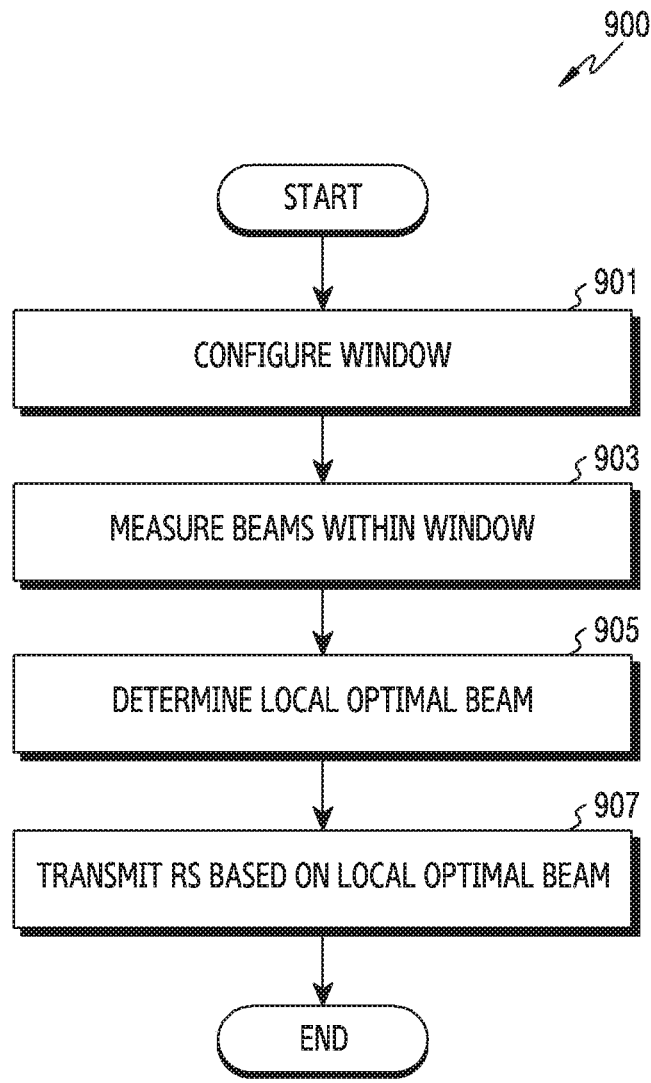
FIG. 9 is a flowchart for determining an optimal beam in a wireless communication system according to an embodiment of the disclosure.

FIG. 9 is a flowchart 900 for determining an optimal beam in a wireless communication system according to an embodiment of the disclosure. FIG. 9 illustrates an operating method of the base station 110. However, the operations of FIG. 9 may be performed by the terminal 120.

Referring to FIG. 9, in operation 901, the base station configures a window. Specifically, when an uncertainty region is determined based on previous location information of the terminal and a sub-set of beam steering vectors corresponding to the uncertainty region is defined, the base station configures a region including a plurality of adjacent beams within the sub-set to search an optimal beam from among the beams within the sub-set.

In operation 903, the base station measures beams within the window. Specifically, the beams may be measured by receiving RSs from the terminal. Measuring beams may refer to measuring a speed at which beams form a reception beam or measuring efficiency of the reception beam. The base station measure all of the plurality of beams within the window through a plurality of RSs received from the terminal.

In operation 905, the base station determines a local optimal beam. Specifically, the base station may determine the best beam based on measurement values of the beams. The best beam within the corresponding window is defined as a local optimal beam. Information regarding where the local optimal beam is located within the window may be separately stored in the storage included in the base station.

In operation 907, the base station transmits RSs through the determined local optimal beam. The RSs transmitted through the local optimal beam may be used to determine a local optimal beam of the terminal.

Figure 10:
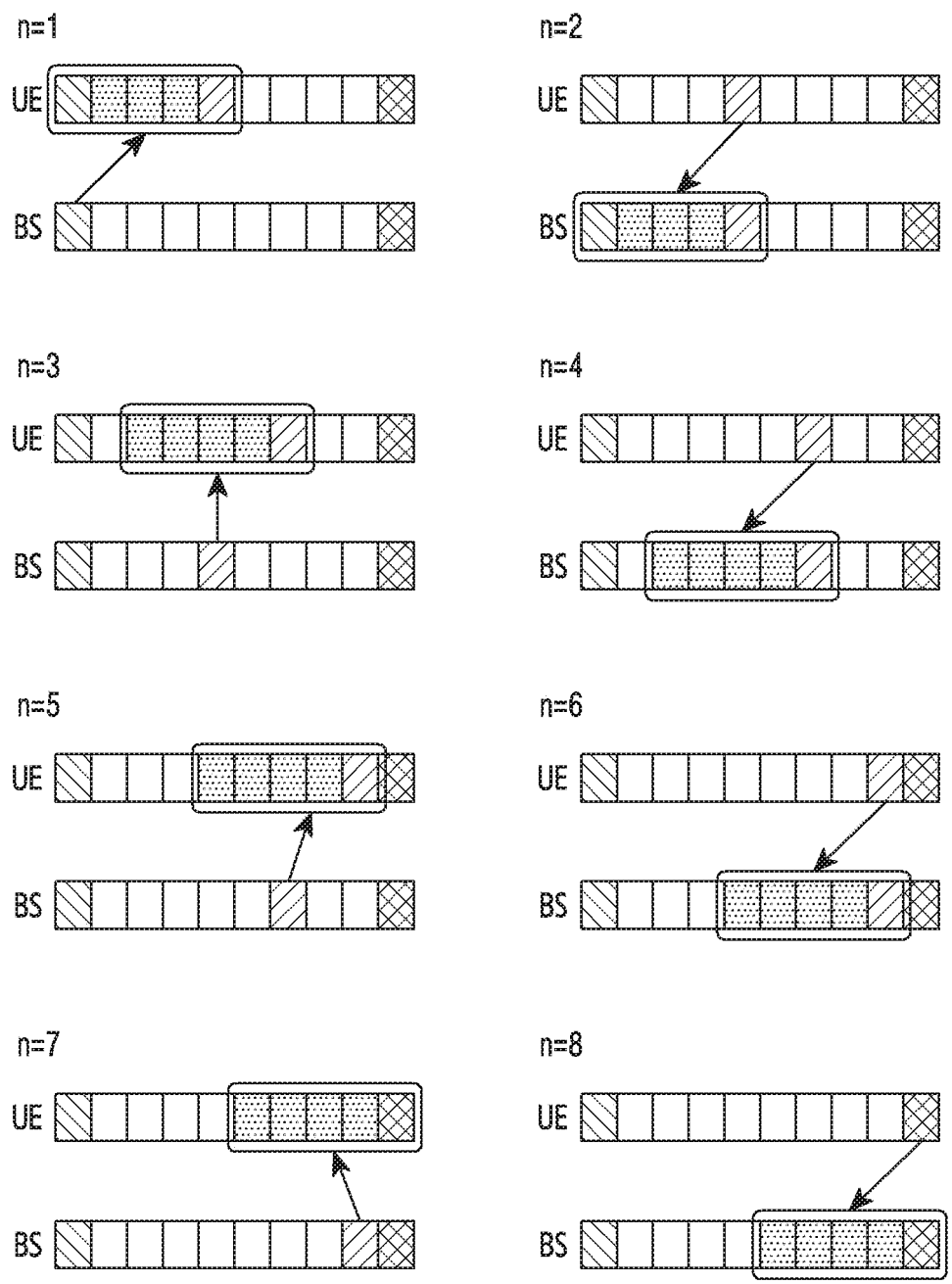
FIG. 10 illustrates an example of operations of searching an optimal beam within a sub-set of beam steering vectors by configuring a window in a wireless communication system according to an embodiment of the disclosure.

FIG. 10 illustrates an example of operations of searching an optimal beam within a sub-set of beam steering vectors by configuring a window in a wireless communication system according to an embodiment of the disclosure. FIG. 10 illustrates a process of searching an optimal beam within a sub-set by transmitting and receiving RSs a total of ten times (n=1~10). When the base station and the terminal are disconnected, the base station estimates a location of the terminal by using previous location information of the terminal, and transmits an initial estimated beam in an estimated direction. The terminal forms a beam set, and receives the initial estimated beam from the base station, and configures a window with reference to a beam receiving the initial estimated beam. The initial estimated beam may include a plurality of RSs. The terminal may determine an optimal beam from among the beams within the window through the RSs. Referring to FIG. 10, it can be identified that, when n is 1, the optimal beam is a beam which exists on the rightmost side of the window of the terminal. This is referred to as a first local optimal beam.

The terminal transmits the RSs to the base station by using the first local optimal beam. An initial direction of the RSs transmitted to the base station may be determined based on known location information of the base station. The base station which receives the RSs from the terminal forms a window with reference to a beam receiving the RSs. The base station determines a second local beam which is optimal within the corresponding window, and transmits the RSs to the terminal again through the determined second local optimal beam. When the terminal transmits RSs to the base station through the first local optimal beam, or the base station transmits RSs to the terminal through the second local optimal beam, the window may be re-configured. The window of the base station or the terminal may be re-configured with reference to their respective local optimal beams, and a criterion for re-configuring may be set to have the respective local optimal beams located at the center of the vectors within the window.

When n=3, the terminal receives RSs from the base station again through the re-configured window. The terminal which receives the RSs determines a third local optimal beam by searching an optimal window within the re-configured window. When the local optimal beam is located at an end of the corresponding window as a result of continuously searching in this way, the search for the optimal beam continues in the direction of the local optimal beam in the received beam, and, when the local optimal beam is discovered at a place other than the end of the corresponding window, the search is ended.

However, even when the optimal beam (which may be referred to as an "actual optimal beam") is determined at the terminal, the search (which may be referred to as "beam alignment" or "beam recovery") may continue as long as an optimal beam is not determined at the base station. In this case, the terminal which already determines the optimal beam is only required to transmit RSs to the base station by using the optimal beam without re-configuring the window. The same is applied when the optimal beam is determined at the base station first.

Referring to FIG. 10, when n=7, an actual optimal beam of the terminal is determined, and, when n=8, an actual optimal beam of the base station is determined. Accordingly, the beam alignment is ended and data is transmitted and received through the determined optimal beam.

Figure 11:
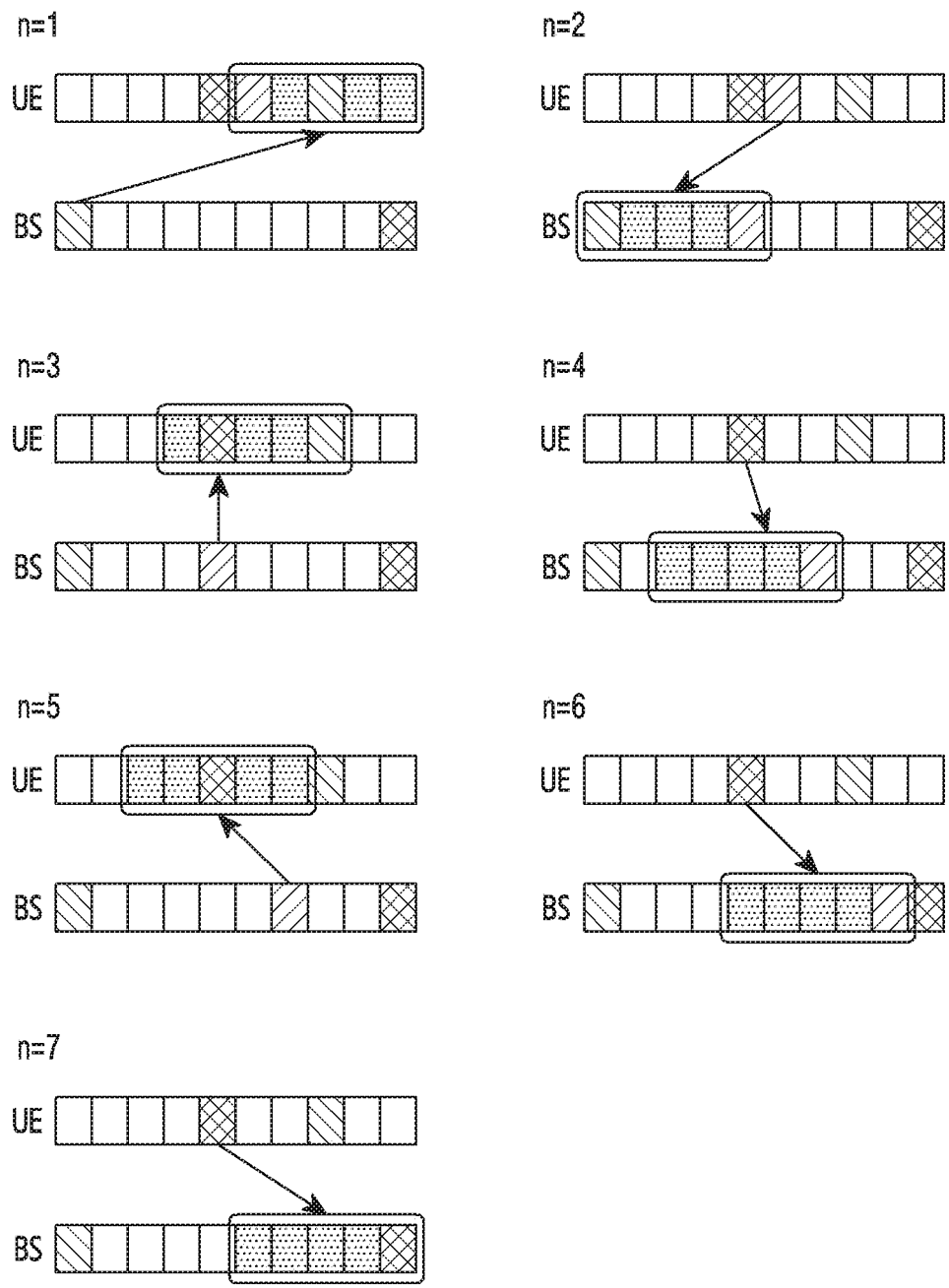
FIG. 11 illustrates another example of operations of searching an optimal beam within a sub-set of beam steering vectors by configuring a window in a wireless communication system according to an embodiment of the disclosure.

FIG. 11 illustrates another example of operations of searching an optimal beam within a sub-set of beam steering vectors by configuring a window in the wireless communication system according to an embodiment of the disclosure. FIG. 11 illustrates a process of searching an optimal beam within a sub-set by transmitting and receiving RSs a total of seven times (n=1~7).

When the base station and the terminal are disconnected, the base station estimates a location of the terminal by using previous location information of the terminal, and transmits an initial estimated beam in an estimated direction. The terminal forms a beam set and receives the initial estimated beam from the base station, and configures a window with reference to a beam receiving the initial estimated beam. The initial estimated beam may include a plurality of RSs. The terminal determines an optimal beam from among the beams within the window through the RSs. Referring to FIG. 11, it can be identified that, when n is 1, the optimal beam within the window is a beam which exists on the leftmost side of the window of the terminal. This beam is referred to as a first local optimal beam.

The terminal transmits RSs to the base station by using the determined first local optimal beam. An initial direction of the RSs that are transmitted to the base station may be determined based on known location information of the base station. The base station which receives the RSs from the terminal forms a window with reference to a beam receiving the RSs. The base station determines a second local beam which is optimal within the corresponding window, and transmits RSs to the terminal again through the determined second local optimal beam. When the terminal transmits RSs to the base station through the first local optimal beam or the base station transmits RSs to the terminal through the second local optimal beam, the window is re-configured. The window of the base station or the terminal may be re-configured with reference to their respective local optimal beams, and a criterion for re-configuring may be set to have the respective local optimal beams located at the center of the vectors within the window.

When n=3, the terminal receives RSs from the base station again through the re-configured window. The terminal which receives the RSs determines a third local optimal beam by searching an optimal window within the re-configured window. When the local optimal beam is located at an end of the corresponding window as a result of continuously searching in this way, the search for the optimal beam continues in the direction of the local optimal beam in the received beam, and, when the local optimal beam is discovered at a place other than the end of the corresponding window, the search is ended.

However, even when the optimal beam (which may be referred to as an "actual optimal beam") is determined at the terminal, the search (which may be referred to as "beam alignment" or "beam recovery") may continue as long as an optimal beam is not determined at the base station. In this case, the terminal which already determines the optimal beam is only required to transmit RSs to the base station by using the optimal beam without re-configuring the window. The same is applied when the optimal beam is determined at the base station first. Referring to FIG. 11, when n=3, an actual optimal beam of the terminal is determined, and, when n=7, an actual optimal beam of the base station is determined. Accordingly, the beam alignment is ended.

Figure 12:
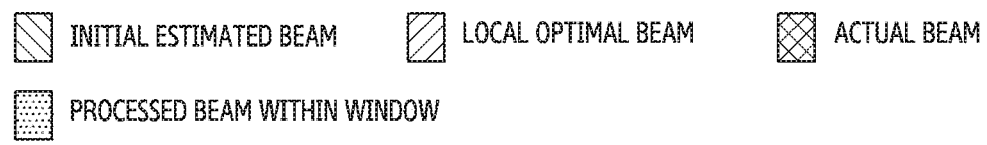
FIG. 12 illustrates another example of operations of searching an optimal beam within a sub-set of beam steering vectors by configuring a window in a wireless communication system according to an embodiment of the disclosure.
Figure 12:
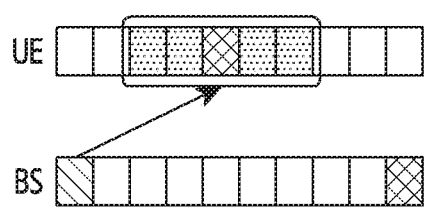
Figure 12:
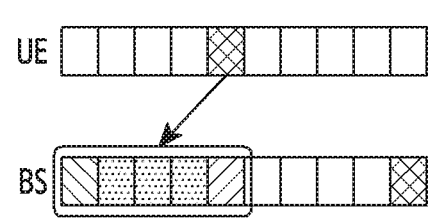
Figure 12:
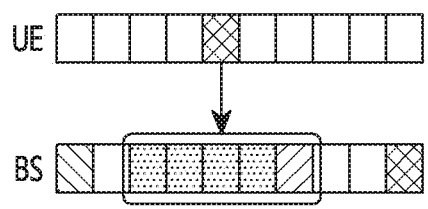
Figure 12:
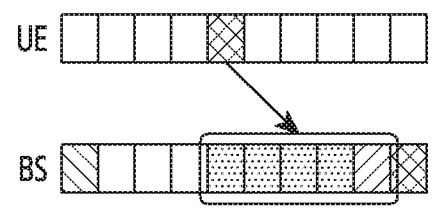
Figure 12:
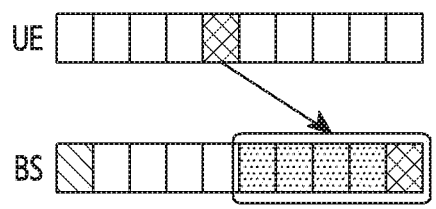

FIG. 12 illustrates another example of operations of searching an optimal beam within a sub-set of beam steering vectors by configuring a window in the wireless communication system according to an embodiment of the disclosure. FIG. 12 illustrates a process of searching an optimal beam within a sub-set by transmitting and receiving RSs a total of five times (n=1~5).

When the base station and the terminal are disconnected, the base station estimates a location of the terminal by using previous location information of the terminal, and transmits an initial estimated beam in an estimated direction. The terminal forms a beam set and receives the initial estimated beam from the base station, and configures a window with reference to a beam receiving the initial estimated beam. The initial estimated beam may include a plurality of RSs. The terminal determines an optimal beam from among the beams within the window through the RSs. Referring to FIG. 12, it can be identified that, when n is 1, the optimal beam within the window is a beam which exists at the center of the window of the terminal. This beam is referred to as a local optimal beam. When the local optimal beam is located at an end of the corresponding window, the search for the optimal beam continues in the direction of the local optimal beam in the received beam, and, when the local optimal beam is discovered at a place other than the end of the corresponding window, the search is ended. However, even when the optimal beam (which may be referred to as an "actual optimal beam") is determined at the terminal, the search (which may be referred to as "beam alignment" or "beam recovery") may continue as long as an optimal beam is not determined at the base station. In this case, the terminal which already determines the optimal beam is only required to transmit RSs to the base station by using the optimal beam without re-configuring the window. The same is applied when the optimal beam is determined at the base station first. Referring to FIG. 12, when n=1, an actual optimal beam of the terminal is determined, and, when n=5, an actual optimal beam of the base station is determined. Accordingly, the beam alignment is ended.

For convenience of explanation, the terms "actual optimal beam," "local optimal beam," "initial estimated beam," are used, but these terms may be understood as "actual optimal beam direction," "local optimal beam direction, "initial estimated beam direction," respectively.

The apparatus and the method according to various embodiments of the disclosure can search an optimal beam with less overhead.

The effect achieved by the disclosure is not limited to that mentioned above, and other effects that are not mentioned above may be clearly understood to those skilled in the art based on the description provided above.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide area network (WAN), or a storage area network (SAN) or a communication network configured by combining the networks. The storage device may access via an external port to the apparatus which performs the embodiments of the disclosure. In addition, an additional storage device on a communication network may access to the apparatus which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first device in a wireless communication system, the method comprising:
configuring a beam set comprising a plurality of beams, based on location information of a second device;
receiving reference signals (RSs) from the second device by using a plurality of adjacent beams included in a window from among the plurality of beams; and
determining an optimal beam from among the beams included in the beam set,
wherein the determining of the optimal beam comprises:
configuring the window comprising the plurality of adjacent beams in the beam set;
measuring beams within the window by using the RSs;
determining a local optimal beam from among the beams, based on a result of the measuring;
re-configuring a window based on the local optimal beam;
transmitting at least one RS, among the RSs, to the second device through the local optimal beam;
determining whether the local optimal beam is located at an end of the window; and
based on the local optimal beam being located at the end, re-configuring a window based on the local optimal beam.

2. The method of claim 1, wherein the receiving of the RSs from the second device comprises receiving the RSs by using a plurality of beams included in the re-configured window.

3. The method of claim 1, wherein the determining of the optimal beam further comprises:
determining whether a measurement value of the local optimal beam is less than a threshold; and
based on the measurement value of the local optimal beam being less than the threshold, re-configuring a window based on the local optimal beam.

4. The method of claim 1, wherein the location information comprises information regarding a previous location of the second device which is based on data already received from the second device.

5. The method of claim 1, wherein a number of beams included in the beam set is based on an error distribution of the location information and beam widths of the beams.

6. The method of claim 1, wherein the configuring of the beam set comprising the plurality of beams comprises:
determining an uncertainty region in which a location of the second device is estimated, based on the location information; and
configuring a beam set corresponding to the uncertainty region.

7. A first device in a wireless communication system, the first device comprising:
a transceiver; and
at least one processor operably coupled to the transceiver, and configured to:
configure a beam set comprising a plurality of beams, based on location information of a second device;
receive reference signals (RSs) from the second device by using a plurality of adjacent beams included in a window from among the plurality of beams; and
determine an optimal beam from among the beams included in the beam set,
wherein the at least one processor is further configured to:
configure the window comprising the plurality of adjacent beams in the beam set;
measure beams within the window by using the RSs;
determine a local optimal beam from among the beams, based on a result of the measuring of the beams;
re-configure a window based on the local optimal beam;
transmit RSs to the second device through the local optimal beam;
determine whether the local optimal beam is located at an end of the window; and
based on the local optimal beam being located at the end, re-configure a window based on the local optimal beam.

8. The first device of claim 7, wherein the at least one processor is further configured to receive the RSs by using a plurality of beams included in the re-configured window.

9. The first device of claim 7, wherein the at least one processor is further configured to:
determine whether a measurement value of the local optimal beam is less than a threshold; and
based on the measurement value of the local optimal beam being less than the threshold, re-configure a window based on the local optimal beam.

10. The first device of claim 7, wherein the location information includes information regarding a previous location of the second device which is based on data already received from the second device.

11. The first device of claim 7, wherein the location information includes information comprising an error distribution of location information.

12. The first device of claim 7, wherein the at least one processor is further configured to:
determine an uncertainty region in which a location of the second device is estimated, based on the location information; and
configure a beam set corresponding to the uncertainty region.

13. The first device of claim 7, wherein the at least one processor is further configured to control the transceiver to perform beam alignment by limiting an uncertainty region by using the location information and an error distribution of the location information.

14. The first device of claim 13, wherein the at least one processor is further configured to control the transceiver to perform a beam recovery operation by reducing a number of the beams to be measured.

* * * * *